(12) United States Patent
Kim (10) Patent No.: US 11,597,447 B2
(45) Date of Patent: Mar. 7, 2023

(54) VEHICLE BODY

(71) Applicants: HYUNDAI MOTOR COMPANY, Seoul (KR); KIA CORPORATION, Seoul (KR)

(72) Inventor: Hyung Tae Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 104 days.

(21) Appl. No.: 17/366,524

(22) Filed: Jul. 2, 2021

(65) Prior Publication Data
US 2022/0081041 A1   Mar. 17, 2022

(30) Foreign Application Priority Data
Sep. 16, 2020   (KR) .................. 10-2020-0119039

(51) Int. Cl.
*B60J 7/00*   (2006.01)
*B62D 25/20*   (2006.01)
*B62D 21/15*   (2006.01)

(52) U.S. Cl.
CPC ....... *B62D 25/2036* (2013.01); *B62D 21/152* (2013.01)

(58) Field of Classification Search
CPC .. B62D 25/20; B62D 25/2036; B62D 25/025; B60K 1/04; B60K 2001/0438; Y02E 60/10; Y02E 60/50; A61P 43/00; H05K 1/165; Y02T 10/70
See application file for complete search history.

(56) References Cited

U.S. PATENT DOCUMENTS

| | | | |
|---|---|---|---|
| 7,104,596 B2 * | 9/2006 | Goto .................. | B62D 25/2036 296/193.07 |
| 2011/0210582 A1 * | 9/2011 | Mori .................. | B62D 25/2036 296/193.07 |
| 2018/0134318 A1 * | 5/2018 | Hata ..................... | B62D 29/008 |
| 2020/0231222 A1 * | 7/2020 | Ahn ....................... | B60N 2/012 |
| 2021/0094626 A1 * | 4/2021 | Kimura .............. | B62D 25/2036 |
| 2021/0170915 A1 * | 6/2021 | Park ..................... | B62D 25/025 |
| 2021/0178883 A1 * | 6/2021 | Kang .................. | B62D 21/157 |
| 2022/0001926 A1 * | 1/2022 | Kim ....................... | B62D 21/11 |
| 2022/0016966 A1 * | 1/2022 | Kecalevic ............ | B62D 25/025 |
| 2022/0017152 A1 * | 1/2022 | Kecalevic ........... | H01M 50/249 |
| 2022/0161867 A1 * | 5/2022 | Choi ..................... | B60K 15/07 |

\* cited by examiner

*Primary Examiner* — Kiran B Patel
(74) *Attorney, Agent, or Firm* — Morgan, Lewis & Bockius LLP (57) ABSTRACT

A vehicle body may include a floor; a pair of side sills connected to first and second side edges of the floor, respectively; and a cross unit mounted on the floor and extending in a width direction of a vehicle, wherein the cross unit includes a lower crossmember connecting the pair of side sills, an upper crossmember disposed above the lower crossmember, a first reinforcement member disposed between the lower crossmember and the upper crossmember, and a pair of second reinforcement members connected to first and second end portions of the first reinforcement member, respectively.

13 Claims, 8 Drawing Sheets

VEHICLE BODY

CROSS-REFERENCE TO RELATED APPLICATION

The present application claims priority to Korean Patent Application No. 10-2020-0119039, filed on Sep. 16, 2020, in the Korean Intellectual Property Office, the entire contents of which is incorporated herein for all purposes by this reference.

BACKGROUND OF THE INVENTION

Field of the Invention

The present invention relates to a vehicle body, and more particularly, to a vehicle body capable of uniformly distributing an impact load in the event of a side impact/collision, thereby improving side impact performance (crashworthiness) and significantly reducing the deformation of a floor.

Description of Related Art

Various crash tests are conducted by the Insurance Institute for Highway Safety (IIHS) to measure vehicle stability, and the conditions for crash tests are being strengthened by the IIHS. For example, the IIHS side-impact crash test conditions include: the weight of a moving deformable barrier (MDB) is increased by 400 Kg; the strength of the MDB is changed; the evaluation speed is increased by 10 KPH; and the ground clearance of the MDB is lowered.

As the IIHS crash test conditions are strengthened, a floor of a vehicle body may be excessively deformed during the IIHS crash test. That is, it is necessary to improve side impact performance (crashworthiness) to ensure safety of occupants against a side impact/collision of the vehicle body.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a vehicle body configured for uniformly distributing an impact load in the event of a side impact/collision, improving side impact performance (crashworthiness) and significantly reducing the deformation of a floor.

According to various aspects of the present invention, a vehicle body may include: a floor; a pair of side sills connected to first and second side edges of the floor, respectively; and a cross unit mounted on the floor and extending in a width direction of a vehicle, wherein the cross unit includes a lower crossmember connecting the pair of side sills, an upper crossmember disposed above the lower crossmember, a first reinforcement member disposed between the lower crossmember and the upper crossmember, and a pair of second reinforcement members connected to first and second end portions of the first reinforcement member, respectively.

Each second reinforcement member may connect an end portion of the first reinforcement member and a corresponding side sill among the pair of side sills.

The vehicle body may further include: a fuel tank mounting bracket attached to a bottom surface of the cross unit; and a floor member attached to a bottom surface of the floor.

The floor member may be connected to the fuel tank mounting bracket, and the floor member may extend in a longitudinal direction of the vehicle.

The floor member may extend from the fuel tank mounting bracket toward the front of the vehicle.

The floor member may have a coupling flange connected to the fuel tank mounting bracket.

The vehicle body may further include a longitudinal member attached to an inboard sidewall of each side sill, wherein the longitudinal member may extend in a longitudinal direction of the vehicle, a front end portion of the longitudinal member may be connected to the cross unit, and the longitudinal member may extend from the cross unit toward the rear of the vehicle.

The first reinforcement member may have a first seat mounting hole to which a seat mounting bracket is connected.

The second reinforcement member may have a second seat mounting hole to which a seat mounting bracket is connected.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the contrary, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the accompanying drawings. In the drawings, the same reference numerals will be used throughout to designate the same or equivalent elements. In addition, a detailed description of well-known techniques associated with the present invention will be ruled out in order not to unnecessarily obscure the gist of the present invention.

Terms such as first, second, A, B, (a), and (b) may be used to describe the elements in exemplary embodiments of the present invention. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which various exemplary embodiments of the present invention belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Referring to FIG. 1, FIG. 2, FIG. 3, and FIG. 4, a vehicle body 10 according to various exemplary embodiments of the present invention may include floors 1 and 2 and a cross unit 20 mounted on the floors 1 and 2.

The floors 1 and 2 may include a center floor 1 and a rear floor 2 connected to a rear edge portion of the center floor 1.

Figure 3:
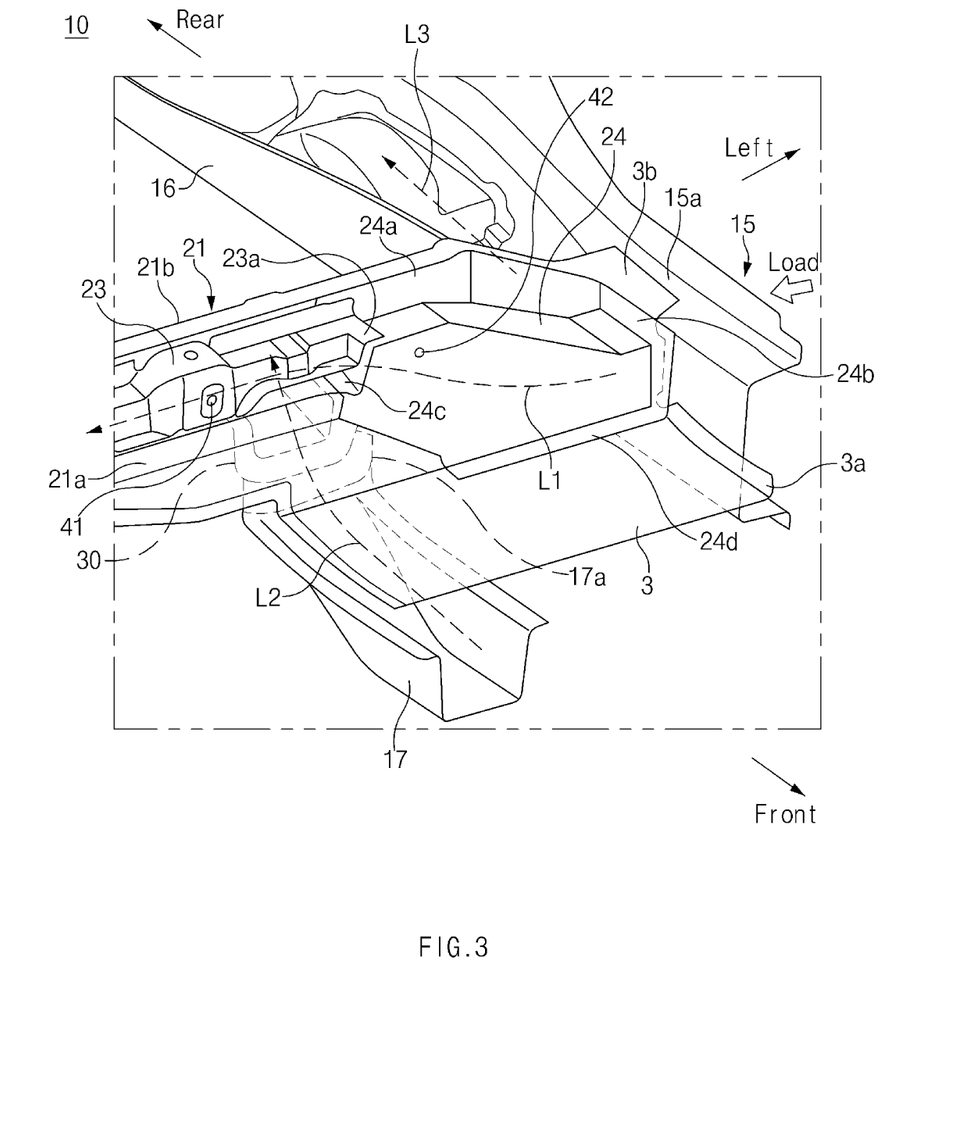
FIG. 3 illustrates a top perspective view of a coupling structure of a cross unit, a side sill, and a longitudinal member in a vehicle body according to various exemplary embodiments of the present invention, from which an upper crossmember of the cross unit is omitted.
Figure 4:
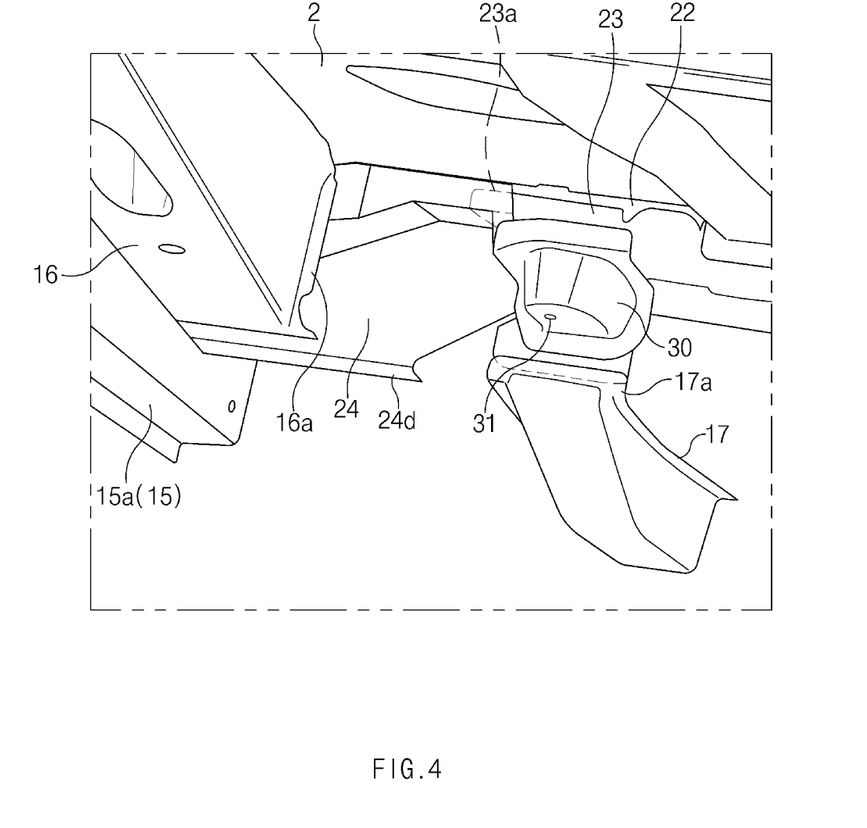
FIG. 4 illustrates a bottom perspective view of a coupling structure of a cross unit, a side sill, and a longitudinal member in a vehicle body according to various exemplary embodiments of the present invention, from which a lower crossmember of the cross unit is omitted.
Figure 5:
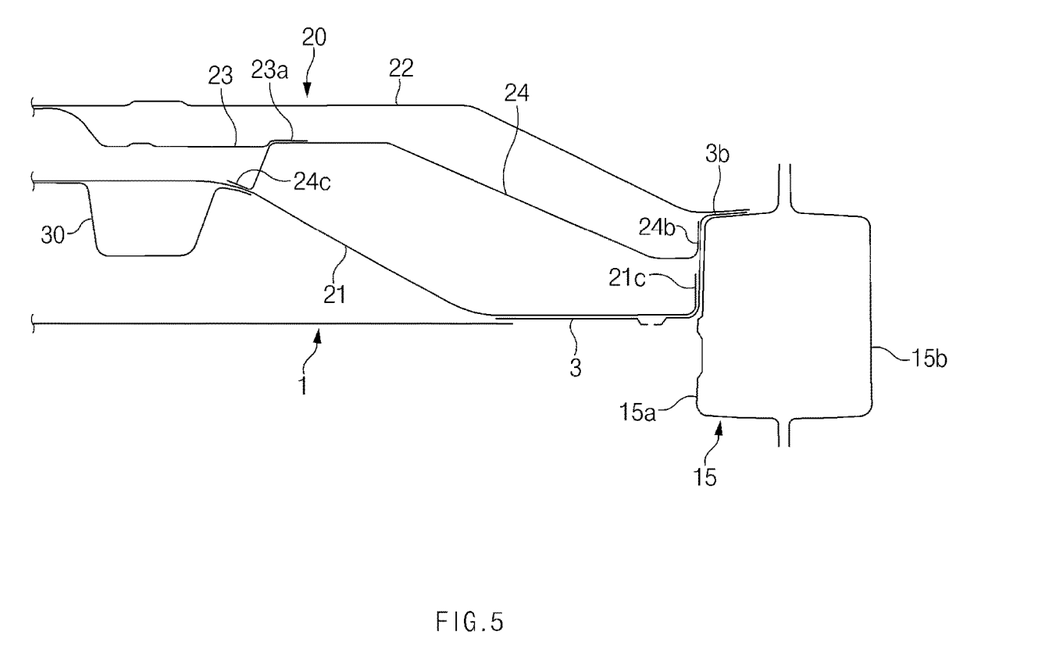
FIG. 5 illustrates a cross-sectional view, taken along line A-A of FIG. 1.

A pair of side sills 15 may be connected to both side edges of the center floor 1. FIG. 1, FIG. 2, FIG. 3, and FIG. 4 illustrate a left side portion of the vehicle body 10. Referring to FIG. 5, each side sill 15 may include an internal side sill 15a and an external side sill 15b. The external side sill 15b may be attached to the internal side sill 15a by welding, using fasteners, and/or the like.

The rear floor 2 may be connected to the rear edge portion of the center floor 1 through the cross unit 20, the side sills 15, longitudinal members 16, and the like.

Figure 1:
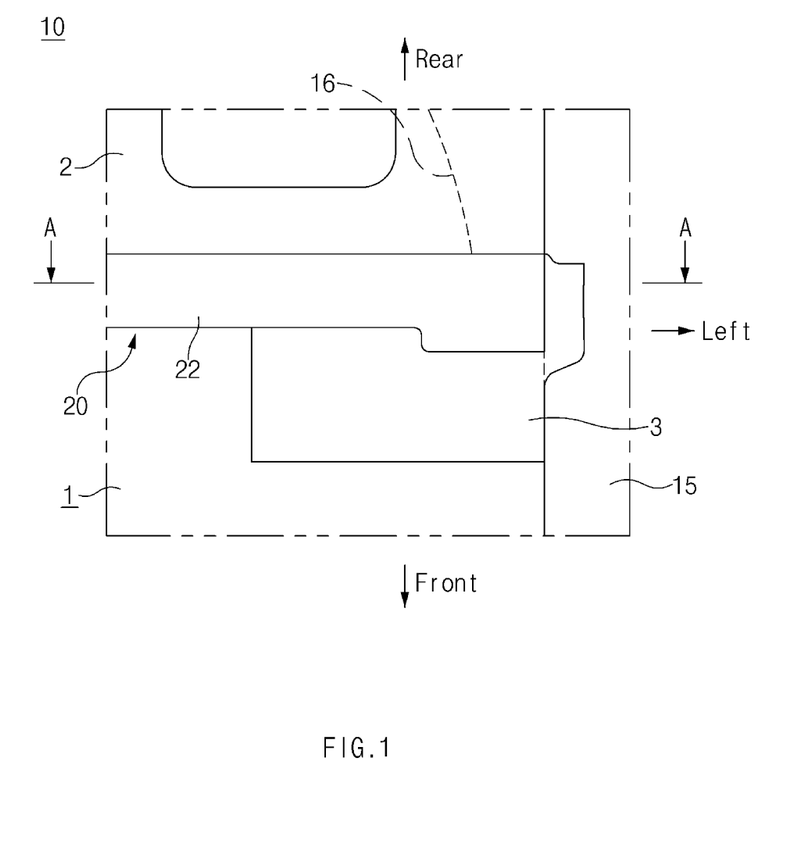
FIG. 1 illustrates a plan view of a portion of a vehicle body according to various exemplary embodiments of the present invention.
Figure 2:
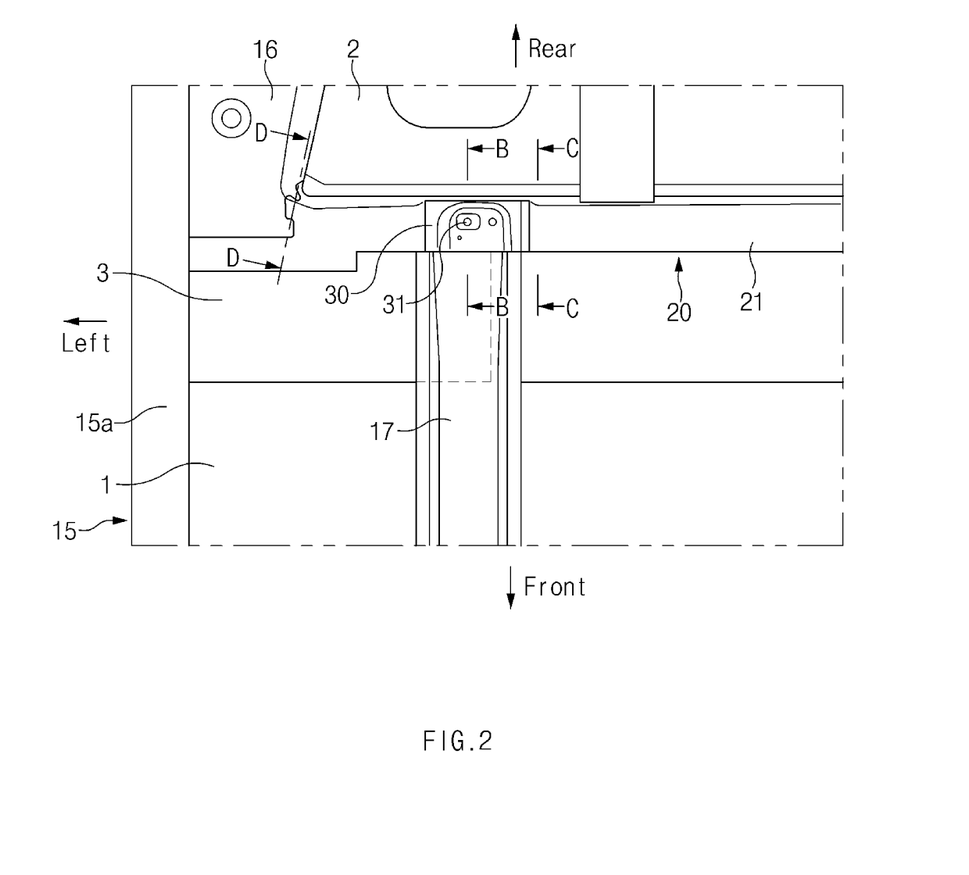
FIG. 2 illustrates a bottom view of a portion of a vehicle body according to various exemplary embodiments of the present invention.

Referring to FIG. 1 and FIG. 2, each longitudinal member 16 may be attached to an inboard side surface of the corresponding internal side sill 15a by welding, using fasteners, and/or the like. The pair of longitudinal members 16 may be attached to both side edges of the rear floor 2. Both side edges of the rear floor 2 may be attached to the corresponding longitudinal members 16, respectively, so that they may cover the top portion of the pair of longitudinal members 16. The longitudinal member 16 may extend in a longitudinal direction of the vehicle, and a longitudinal axis of the longitudinal member 16 may be parallel to a longitudinal axis of the side sill 15. The longitudinal member 16 may be attached to a bottom surface of the rear floor 2. The longitudinal member 16 may also be referred to as a rear side member.

FIG. 1, FIG. 2, FIG. 3, and FIG. 4 illustrate the rear edge portion of the center floor 1 located on the left side of the vehicle body 10, and the cross unit 20, the side sill 15, and the longitudinal member 16 connected thereto.

The center floor 1 may include an intermediate floor panel 3, and the intermediate floor panel 3 may form a portion of the rear of the center floor 1. The intermediate floor panel 3 and the center floor 1 may be joined by welding, using fasteners, and/or the like. Referring to FIG. 3, the intermediate floor panel 3 may have a first side flange 3a extending vertically from a side edge portion thereof, and a second side flange 3b extending horizontally from the side edge portion thereof. The second side flange 3b may be located higher than the first side flange 3a. The first side flange 3a may be joined to an inboard sidewall of the internal side sill 15a of the side sill 15 by welding, using fasteners, and/or the like, and the second side flange 3b may be joined to a top wall of the internal side sill 15a of the side sill 15 by welding, using fasteners, and/or the like.

The cross unit 20 may be mounted on a top surface of the center floor 1, and extend in a width direction of the vehicle.

According to various exemplary embodiments of the present invention, the cross unit 20 may be mounted on the rear edge portion of the center floor 1, and the cross unit 20 may be disposed between the center floor 1 and the rear floor 2.

Referring to FIG. 1, FIG. 2, FIG. 3, FIG. 4, and FIG. 5, the cross unit 20 may include a lower crossmember 21 connected to the center floor 1, an upper crossmember 22 disposed above the lower crossmember 21, a first reinforcement member 23 disposed between the lower crossmember 21 and the upper crossmember 22, and a pair of second reinforcement members 24 connected to both end portions of the first reinforcement member 23, respectively.

The lower crossmember 21 may extend in the width direction of the vehicle. Each end portion of the lower crossmember 21 may be joined to the internal side sill 15a of the corresponding side sill 15 by welding, using fasteners, and/or the like, and thus the lower crossmember 21 may connect the pair of side sills 15 along the width direction of the vehicle. The lower crossmember 21 may include a bottom flange 21a extending vertically from a bottom edge portion thereof, and a top flange 21b extending horizontally from a top edge portion thereof.

The bottom flange 21a of the lower crossmember 21 may be joined to the center floor 1 by welding, using fasteners, and/or the like. At least a portion of the bottom flange 21a may be joined to the intermediate floor panel 3 of the center floor 1. The top flange 21b of the lower crossmember 21 may be joined to the upper crossmember 22 by welding, using fasteners, and/or the like.

The upper crossmember 22 may extend in the width direction of the vehicle, and a length of the upper crossmember 22 may be similar to or the same as a length of the lower crossmember 21. The upper crossmember 22 may be joined to the bottom flange 21a and the top flange 21b of the lower crossmember 21 by welding, using fasteners, and/or the like. Thus, the lower crossmember 21 and the upper crossmember 22 may form a closed transverse cross-section.

The first reinforcement member 23 may extend in the width direction of the vehicle, and a length of the first reinforcement member 23 may be less than the length of the lower crossmember 21 and the length of the upper crossmember 22. The first reinforcement member 23 may be joined to the lower crossmember 21 by welding, using fasteners, and/or the like.

The first reinforcement member 23 may have an end flange 23a extending from each end portion of the first reinforcement member 23 toward the corresponding second reinforcement member 24, and the end flange 23a of the first reinforcement member 23 may be joined to the second reinforcement member 24 by welding, using fasteners, and/or the like. As the second reinforcement member 24 is directly connected to the first reinforcement member 23, the first reinforcement member 23 and the second reinforcement member 24 may define a first load path L1 (see FIG. 3) along the width direction of the vehicle.

Figure 7:
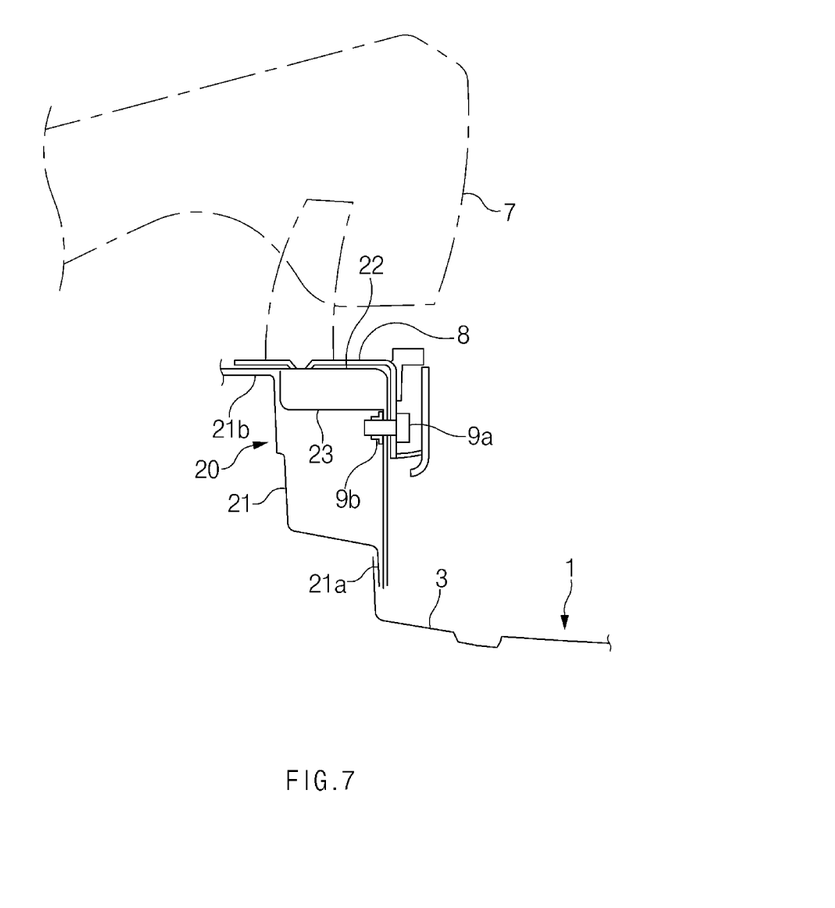
FIG. 7 illustrates a cross-sectional view, taken along line C-C of FIG. 2.

Referring to FIG. 3, the first reinforcement member 23 may have at least one first seat mounting hole 41 to which a seat mounting bracket is connected, and the upper crossmember 22 may have a through hole corresponding to the first seat mounting hole 41 of the first reinforcement member 23. Referring to FIG. 7, a bolt 9a and a nut 9b may engage with the first seat mounting hole 41 of the first reinforcement member 23 and the through hole of the upper crossmember 22 so that a seat mounting bracket 8 of a vehicle seat 7 may be connected to the first reinforcement member 23. As the first seat mounting hole 41 is integrally formed in the first reinforcement member 23, a separate bracket for the connection of the seat mounting bracket may not be required unlike a conventional one, and thus the weight and cost may be reduced.

The pair of second reinforcement members 24 may be joined to both end portions of the first reinforcement member 23 by welding, using fasteners, and/or the like, respectively. FIG. 3 and FIG. 4 show that the second reinforcement member 24 located on the left side of the vehicle is joined to the left end portion of the first reinforcement member 23 by welding, using fasteners, and/or the like. Although not shown, the second reinforcement member 24 located on the right side of the vehicle may be joined to the right end portion of the first reinforcement member 23 by welding, using fasteners, and/or the like.

Each second reinforcement member 24 may be joined to the lower crossmember 21 and the intermediate floor panel 3 of the center floor 1. The second reinforcement member 24 may have a top edge portion facing the top portion of the vehicle, a bottom edge portion facing the bottom portion of the vehicle, a first end portion facing the side sill 15, and a second end portion facing the first reinforcement member 23. Referring to FIG. 3 and FIG. 4, each second reinforcement member 24 may include a top flange 24a extending vertically from the top edge of the second reinforcement member 24, a first side flange 24b extending from the first end portion of the second reinforcement member 24 toward the side sill 15, a second side flange 24c extending from the second end portion of the second reinforcement member 24 toward the first reinforcement member 23, and a bottom flange 24d extending horizontally from the bottom edge portion of the second reinforcement member 24.

The top flange 24a of the second reinforcement member 24 may be joined to the lower crossmember 21 by welding, using fasteners, and/or the like, and the first side flange 24b of the second reinforcement member 24 may be joined to a sidewall of the intermediate floor panel 3 and/or the inboard sidewall of the internal side sill 15a of the side sill 15 by welding, using fasteners, and/or the like. The second side flange 24c of the second reinforcement member 24 may be joined to an end portion of the first reinforcement member 23 by welding, using fasteners, and/or the like, and the bottom flange 24d of the second reinforcement member 24 may be joined to the intermediate floor panel 3 of the center floor 1 by welding, using fasteners, and/or the like. Each second reinforcement member 24 may connect the end portion of the first reinforcement member 23 and the corresponding side sill 15, and thus a load applied to the side sill 15 may be transferred through the cross unit 20 in the width direction of the vehicle. In addition, each second reinforcement member 24 may connect the lower crossmember 21 and the intermediate floor panel 3 of the center floor 1, and thus the load applied to the side sill 15 may be uniformly transferred through the center floor 1.

Referring to FIG. 3, the second reinforcement member 24 may have at least one second seat mounting hole 42 to which a seat mounting bracket is connected, and the upper crossmember 22 may have a through hole corresponding to the second seat mounting hole 42 of the second reinforcement member 24. Similar to the first seat mounting hole 41 of the first reinforcement member 23, a bolt and a nut may engage with the second seat mounting hole 42 of the second reinforcement member 24 and the through hole of the upper crossmember 22, and the seat mounting bracket of the vehicle seat may be connected to the second reinforcement member 24. As the second seat mounting hole 42 is integrally formed in the second reinforcement member 24, a separate bracket for the connection of the seat mounting bracket may not be required unlike a conventional one, and thus the weight and cost may be reduced.

Figure 6:
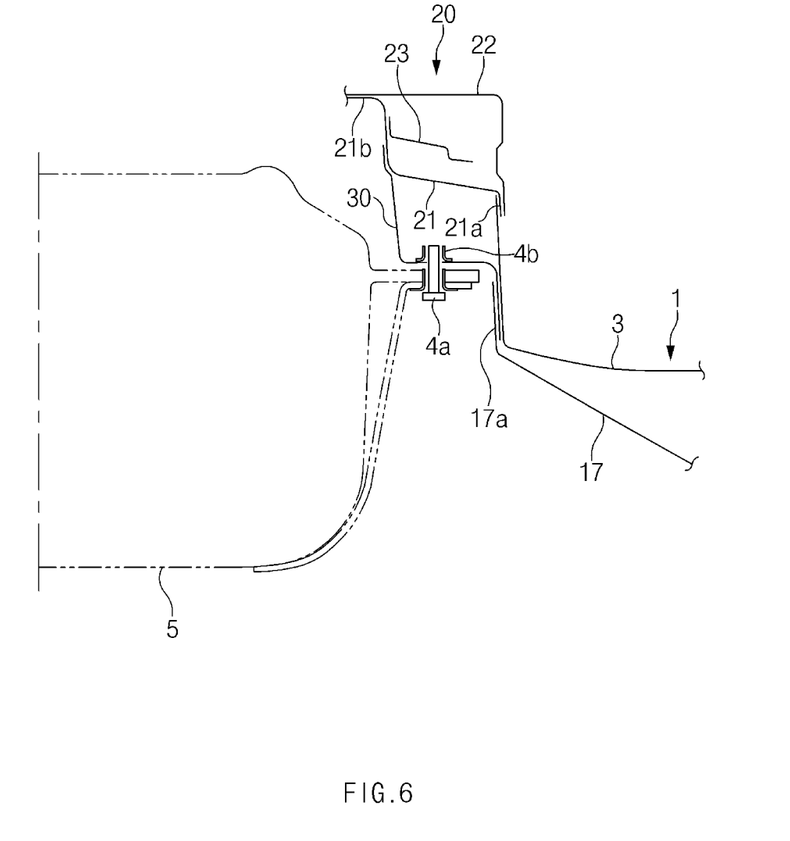
FIG. 6 illustrates a cross-sectional view, taken along line B-B of FIG. 2.

Referring to FIGS. 3 and 6, a fuel tank mounting bracket 30 may be attached to a bottom surface of the cross unit 20. The fuel tank mounting bracket 30 may be joined to the lower crossmember 21 of the cross unit 20 by welding, using fasteners, and/or the like.

Referring to FIG. 6, a fuel tank 5 may be mounted to the fuel tank mounting bracket 30, and a mounting flange of the fuel tank 5 may be mounted in a mounting hole 31 (see FIG. 4) of the fuel tank mounting bracket 30 through a bolt 4a and a nut 4b.

A floor member 17 may be adjacent to the fuel tank mounting bracket 30, and the floor member 17 may be attached to a bottom surface of the center floor 1. The floor member 17 may extend in the longitudinal direction of the vehicle. The floor member 17 may extend from the fuel tank mounting bracket 30 toward the front of the vehicle. Referring to FIGS. 4 and 6, the floor member 17 may have a coupling flange 17a, and the coupling flange 17a of the floor member 17 may be joined to the fuel tank mounting bracket 30 by welding, using fasteners, and/or the like as illustrated in FIG. 6.

According to various exemplary embodiments of the present invention, the pair of fuel tank mounting brackets 30 may be attached to the cross unit 20, and the pair of fuel tank mounting brackets 30 may be arranged symmetrically in relation to a central longitudinal axis of the vehicle. The pair of floor members 17 may be attached to the bottom surface of the center floor 1, and the pair of floor members 17 may be arranged symmetrically in relation to the central longitudinal axis of the vehicle. As each floor member 17 is directly connected to the corresponding fuel tank mounting bracket 30 through the coupling flange 17a, the floor member 17 and the fuel tank mounting bracket 30 may define a second load path L2 (see FIG. 3) in the longitudinal direction of the vehicle.

The longitudinal member 16 may be attached to the bottom surface of the rear floor 2, and a front end portion of the longitudinal member 16 may be connected to the intermediate floor panel 3 of the center floor 1 and the cross unit 20. The longitudinal member 16 may extend from the cross unit 20 toward the rear of the vehicle.

Figure 8:
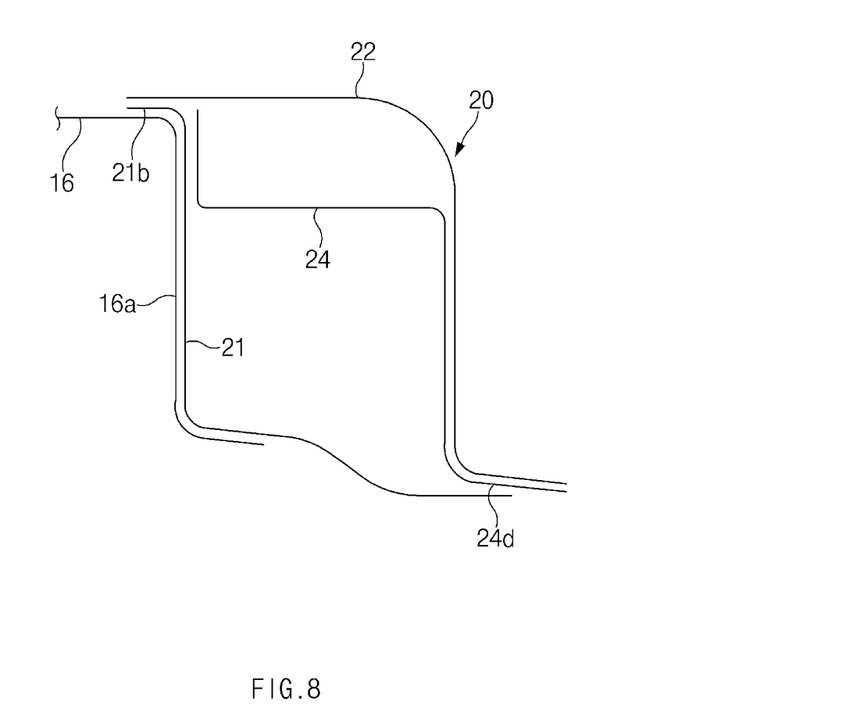
FIG. 8 illustrates a cross-sectional view, taken along line D-D of FIG. 2.

Referring to FIG. 4, the longitudinal member 16 may have an internal flange 16a extending toward the interior of the vehicle. Referring to FIG. 8, the internal flange 16a of the longitudinal member 16 may be joined to the lower crossmember 21 of the cross unit 20 by welding, using fasteners, and/or the like, and thus the longitudinal member 16 may be directly connected to the lower crossmember 21. As the longitudinal member 16 is directly connected to the lower crossmember 21, the longitudinal member 16 may define a third load path L3 (see FIG. 3) in the longitudinal direction of the vehicle.

As set forth above, according to exemplary embodiments of the present invention, when an impact load caused by a side impact/collision of the vehicle is applied to the side sill 15, the impact load may be transferred through the first load path L1 in the width direction of the vehicle, and be transferred through the second load path L2 and the third load path L3 in the longitudinal direction of the vehicle. Thus, impact energy may be uniformly distributed, and crashworthiness of the vehicle body may be significantly improved.

According to exemplary embodiments of the present invention, the end flange 23a of the first reinforcement member 23 may be directly connected to the second reinforcement member 24, the internal flange 16a of the longitudinal member 16 may be directly connected to the lower crossmember 21 of the cross unit 20, and the coupling flange 17a of the floor member 17 may be directly connected to the fuel tank mounting bracket 30, and thus the vehicle body may be reinforced to ensure stiffness, and noise, vibration, and harshness (NVH) performance may be improved.

According to exemplary embodiments of the present invention, the first seat mounting hole 41 may be integrally formed in the first reinforcement member 23, and the second seat mounting hole 42 may be integrally formed in the second reinforcement member 24. Since a separate bracket for the connection of the seat mounting bracket is not required, the number of components, weight, and cost may be reduced.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle body comprising:
   a floor;
   a pair of side sills connected to first and second side edges of the floor, respectively; and
   a cross unit mounted on the floor and extending in a width direction of a vehicle,
   wherein the cross unit includes a lower crossmember connecting the pair of side sills, an upper crossmember disposed above the lower crossmember, a first reinforcement member disposed between the lower crossmember and the upper crossmember, and a pair of second reinforcement members connected to first and second end portions of the first reinforcement member, respectively.

2. The vehicle body according to claim 1, wherein each of the second reinforcement members connects an end portion of the first reinforcement member and a corresponding side sill among the pair of side sills.

3. The vehicle body according to claim 2, wherein each of the second reinforcement members is connected to a portion of the lower crossmember.

4. The vehicle body according to claim 1, further including:
   a fuel tank mounting bracket attached to a bottom surface of the cross unit; and
   a floor member attached to a bottom surface of the floor,
   wherein the floor member is connected to the fuel tank mounting bracket, and
   wherein the floor member extends in a longitudinal direction of the vehicle.

5. The vehicle body according to claim 4, wherein the floor member is directly connected to the fuel tank mounting bracket.

6. The vehicle body according to claim 4, wherein the floor member extends from the fuel tank mounting bracket toward a front of the vehicle.

7. The vehicle body according to claim 4, wherein the floor member has a coupling flange connected to the fuel tank mounting bracket.

8. The vehicle body according to claim 4,
   wherein a first end portion of the fuel tank mounting bracket is attached to the lower crossmember of the cross unit,
   wherein the floor member has a coupling flange,
   wherein the floor includes an intermediate floor panel, and
   wherein a second end portion of the fuel tank mounting bracket is connected to the coupling flange of the floor member and the intermediate floor panel of the floor.

9. The vehicle body according to claim 1, further including:
   a longitudinal member attached to an inboard sidewall of each side sill,
   wherein the longitudinal member is disposed to extend in a longitudinal direction of the vehicle,
   wherein a front end portion of the longitudinal member is connected to the cross unit, and
   wherein the longitudinal member is disposed to extend from the cross unit toward a rear of the vehicle.

10. The vehicle body according to claim 9, wherein the front end portion of the longitudinal member is directly connected to the cross unit.

11. The vehicle body according to claim 10, wherein a first end portion of the lower crossmember is directly connected to a first end portion of the lower crossmember of the cross unit, a first end of the upper crossmember is connected to the first end portion of the lower crossmember, a first end portion of the second reinforcement member is connected to the first end portion of the lower crossmember, and a second end of the upper crossmember and a second end portion of the second reinforcement member are connected to a second end portion of the lower crossmember.

12. The vehicle body according to claim 1, wherein the first reinforcement member has a first seat mounting hole to which a seat mounting bracket is connected.

13. The vehicle body according to claim 1, wherein the second reinforcement member has a second seat mounting hole to which a seat mounting bracket is connected.

\* \* \* \* \*